(12) United States Patent
Bert

(10) Patent No.: US 12,461,852 B2
(45) Date of Patent: Nov. 4, 2025

(54) RAID REGION ALIGNMENT FOR FDP COMPLIANT SSD

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/775,184

(22) Filed: Jul. 17, 2024

(65) Prior Publication Data
US 2025/0053509 A1 Feb. 13, 2025

Related U.S. Application Data

(60) Provisional application No. 63/531,108, filed on Aug. 7, 2023.

(51) Int. Cl.
G06F 12/02 (2006.01)
G06F 3/06 (2006.01)
G06F 11/10 (2006.01)

(52) U.S. Cl.
CPC ........ G06F 12/0246 (2013.01); G06F 3/0619 (2013.01); G06F 3/0644 (2013.01); G06F 3/0688 (2013.01); G06F 11/1076 (2013.01); G06F 11/108 (2013.01)

(58) Field of Classification Search
None
See application file for complete search history.

(56) References Cited

U.S. PATENT DOCUMENTS

| 2018/0018231 A1 | 1/2018 | Okada et al. |
| 2018/0129600 A1 | 5/2018 | Ishiyama et al. |
| 2019/0095281 A1 | 3/2019 | Pioch et al. |

(Continued)

FOREIGN PATENT DOCUMENTS

| KR | 101079367 | 11/2011 |
| KR | 102490191 | 1/2023 |
| WO | 2025034370 | 2/2025 |

OTHER PUBLICATIONS

"International Application Serial No. PCT US2024 038297, International Search Report mailed Oct. 28, 2024", 3 pgs.

(Continued)

*Primary Examiner* — Kaushikkumar M Patel
(74) *Attorney, Agent, or Firm* — Schwegman Lundberg & Woessner, P.A.

(57) ABSTRACT

The disclosure configures a memory sub-system controller to perform Redundant Array of Independent Disks (RAID) stripe deletion based on physical region size. The controller stores a set of data across a plurality of memory components, a first of the plurality of components being configured to store data in a first set of regions, a second of the plurality of components being configured to store data in a second set of regions. The controller generates a plurality of error correction parity information stripes for multiple collections of the set of data and computes a quantity of the plurality of error correction parity information stripes to delete based on sizes of each region in the first and second sets of regions. The controller deletes one or more of the plurality of error correction parity information stripes based on the computed quantity.

20 Claims, 7 Drawing Sheets

(56) References Cited

U.S. PATENT DOCUMENTS

| | | | |
|---|---|---|---|
| 2024/0012579 A1* | 1/2024 | Helmick | G06F 12/0246 |
| 2024/0143171 A1* | 5/2024 | Helmick | G06F 3/0652 |
| 2024/0320029 A1* | 9/2024 | Bert | G06F 9/45558 |
| 2024/0411477 A1* | 12/2024 | Li | G06F 3/0655 |

OTHER PUBLICATIONS

"International Application Serial No. PCT US2024 038297, Written Opinion mailed Oct. 28, 2024", 3 pgs.

* cited by examiner

RAID REGION ALIGNMENT FOR FDP COMPLIANT SSD

PRIORITY APPLICATION

This application claims the benefit of priority to U.S. Provisional Application Ser. No. 63/531,108, filed Aug. 7, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components. Some memory sub-systems arrange their memory components into reclaim groups (RGs), each of which includes sets of reclaim units (RUs). Such memory sub-systems enable a host to control the physical location (e.g., by RG and/or RU via an RU handle) into which data is programmed.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
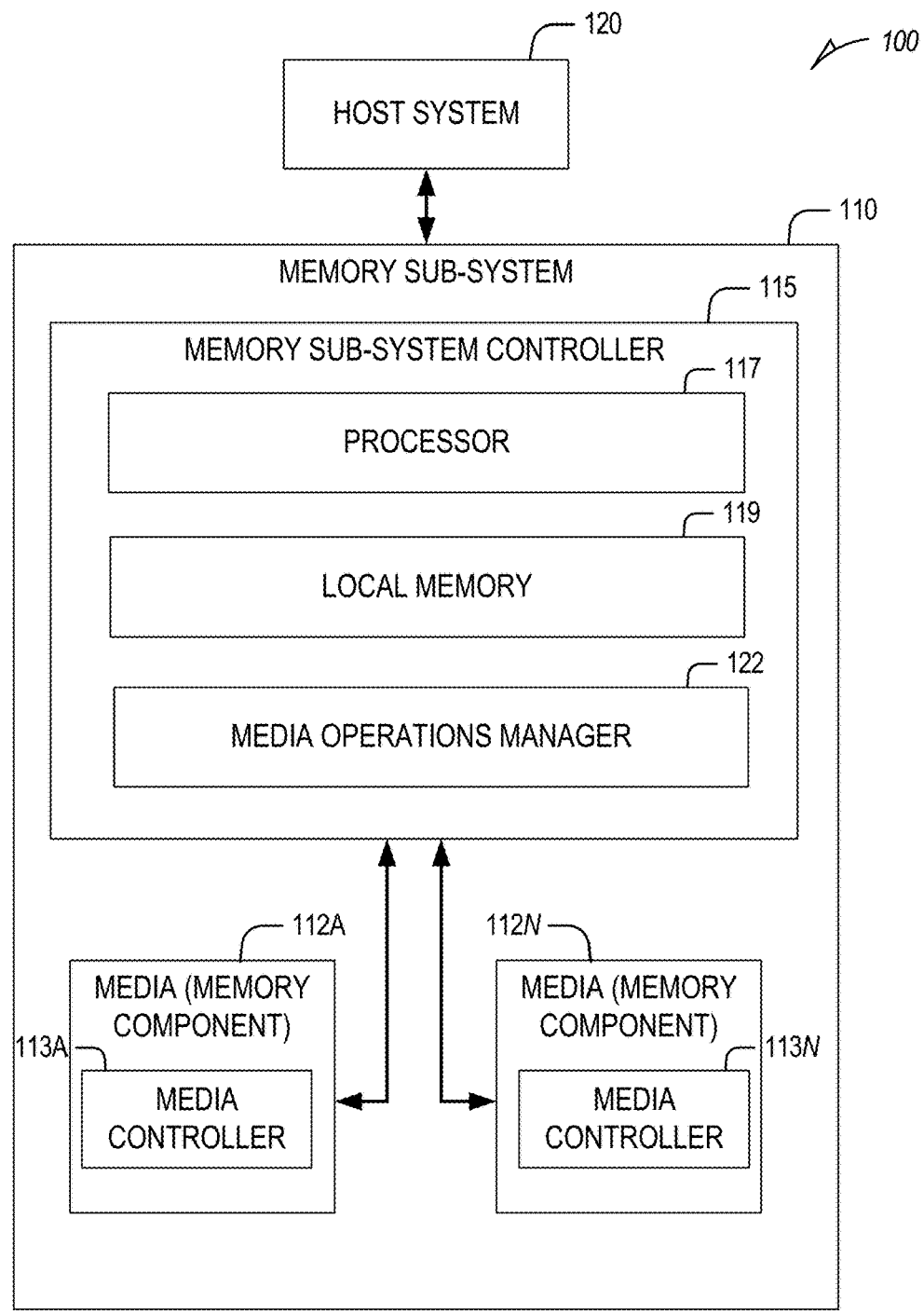
FIG. 1 is a block diagram illustrating an example computing environment including a memory sub-system, in accordance with some examples of the present disclosure.

Examples of the present disclosure configure a system component, such as a memory sub-system controller (and/or host), to generate and delete error-correction parity data, such as Redundant Array of Independent Nodes (RAIN), also known as Redundant Array of Independent Disks (RAID). The controller can program or write data to the memory components and can generate error correction parity information stripes for different collections of the written data independently of the region sizes of the memory components. The controller can determine there exists a need to free up space from the memory components, such as by deleting one or more error correction parity information stripes. In such cases, the controller can select how many adjacent error correction parity information stripes to delete in a way that ensures at least one entire region is deleted from each of the memory components. To do so, the controller can access configuration information of the memory sub-system to determine a size of a largest one of the regions. Based on that size, the controller selects a number of error correction parity information stripes that in total have a size that corresponds to a factor or two or more of the determined size of the largest one of the regions. In this way the RAID controller can lay out data through stripes with no dependency from the physical layer, making it very flexible and usable on a variety of configurations. Specifically, the disclosed techniques move the region alignment operations from being performed by the data location layer to a garbage collection module.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

In some cases, the memory sub-system includes an optional feature, such as a Flexible Data Placement (FDP) feature that defines replacement groups (RGs) and reclaim units (RUs). This protocol enables remote hosts to control data storage on the memory sub-systems. Some memory sub-systems define or generate virtual memory groups, such as virtual RUs. These virtual memory groups can be implemented by multiple different physical memory components and/or portions of physical memory components. By defining virtual memory groups, the data block size available to a host to store data can be kept constant across different technologies of memory sub-systems and as different portions of various blocks reach their end of life, such as when they reach their maximum PECs.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Certain memory systems group the physical memory components into different RGs where each RG includes multiple RUs. The RUs can be of any size that is at least as large as the LUN. Namely, the RU can be the size of a single block or can be the size of a superblock spanning multiple memory dies. In some cases, each RU and/or RG can correspond to and be implemented by a different SSD. These memory systems allow hosts to store data to certain RG and/or to certain RUs within those RGs using corresponding RU handles (write pointers). This provides greater control to the host as to where data is physically stored. Once data is stored to an individual RG, garbage collection operations can be performed but are limited to folding data using the RUs of the individual RG. Namely, in some cases, data cannot be folded into any RU or another RG but all remains stored in the same RG.

Conventional memory sub-systems can employ error-correction techniques, such as using a redundant array of independent NAND-type flash memory devices (hereafter, referred to as a RAIN technique), to protect data (e.g., host or user data) stored on the memory sub-systems. Error-correction techniques can include calculating parity (e.g., XOR parity) across some collection of data (e.g., host/user data) being error-protected. In some cases, the parity is generated for a collection of data stored across a group of memory components (e.g., SSDs) and/or RUs and/or RGs. By such error-correction techniques, if a data member of the collection is lost (e.g., corrupted) for any reason, the parity calculation can be reperformed and the lost data recreated. Data in such conventional memory sub-systems is usually written sequentially across multiple dies of the NAND memory devices. When the data is completely written across a given row of blocks (RUs and/or RGs) of a specified set of dies (or SSDs) of the memory devices, the RAIN parity calculation is performed and stored in a parity block associated with the given row. The parity data and associated data written across the given row of blocks (RUs and/or RGs) forms an error correction parity information stripe. The error correction parity information stripe can be of any designated size with a minimum size being based on an aggregated size of individual respective regions across each of the memory components or portions of such regions.

While such approaches for generating the RAID parity generally work well for conventional memory devices, these approaches cannot be applied to FDP memory systems. This is because, in such systems, at least one region (e.g., RU, RG, and/or block) from each memory component used to store data for a given error correction parity information stripe needs to be entirely deleted or freed when the error correction parity information stripe is deleted. Specifically, because different memory components can have different sized regions, the error correction parity information stripe used to represent data stored in the memory components is not perfectly aligned to the regions. In such cases, deletion of an individual error correction parity information stripe can result in portions of regions from each memory component being deleted rather than entire regions being deleted from each memory component. This can adversely impact performance of garbage collection operations and other memory operations used in FDP systems. This can slow down the overall memory sub-system and can prolong performing other operations, which introduces inefficiencies.

Examples of the present disclosure address the above and other deficiencies by providing a memory controller (e.g., a RAID controller and/or host) that can ensure sufficient quantity of error correction parity information stripes are deleted to provide at least one completely empty region in each memory component of the memory sub-system. This increases the overall efficiency of operating the memory sub-system.

In some examples, the memory controller stores a set of data across a plurality of memory components of the set of memory components, a first of the plurality of components being configured to store data in a first set of regions, a second of the plurality of components being configured to store data in a second set of regions. The memory controller generates a plurality of error correction parity information stripes for multiple collections of the set of data, each of the plurality of error correction parity information stripes including a respective collection of data and parity data associated with the respective collection of data. The memory controller computes a quantity of the plurality of error correction parity information stripes to delete based on sizes of each region in the first set of regions and the second set of regions and deletes one or more of the plurality of error correction parity information stripes based on the computed quantity.

In some examples, the techniques described herein relate to a system, wherein the memory sub-system includes Flexible Data Placement (FDP). In some cases, the controller groups the set of memory components into a plurality of reclaim groups (RGs), each RG of the plurality of RGs comprising a subset of reclaim units (RUS), the first set of regions comprising a first subset of RUs and the second set of regions comprising a second subset of RUs.

In some examples, the plurality of error correction parity information stripes includes Redundant Array of Independent Nodes (RAIN) or Redundant Array of Independent Disks (RAID) parity data. In some examples, the controller determines a first size of a first region in the first set of regions and a second size of a second region in the second set of regions. The controller determines that the second size is larger than the first size and, in response to determining that the second size is larger than the first size, computes the quantity of the plurality of error correction parity information stripes to delete based on the second size.

In some examples, the controller computes a first value by multiplying the second size by a factor of two or more. The controller determines how many memory components are included in the plurality of memory components and multiplies the first value by a number that represents how many memory components are included in the plurality of memory components to compute a minimum error correction parity information stripe deletion size. In some cases, the controller determines a size of each error correction parity information stripe of the plurality of error correction parity information stripes.

In some examples, the controller selects a first error correction parity information stripe to delete and determines that the size of the first error correction parity information stripe is smaller than the minimum error correction parity information stripe deletion size. The controller, in response to determining that the size of the first error correction parity information stripe is smaller than the minimum error correction parity information stripe deletion size, selects one or more additional error correction parity information stripes to delete until a total size of the first error correction parity information stripe and the one or more additional error correction parity information stripes corresponds to the minimum error correction parity information stripe deletion size.

In some examples, the controller accesses configuration data associated with the memory sub-system to determine sizes of the first set of regions and the second set of regions. In some cases, a host computes the quantity of the plurality of error correction parity information stripes to delete.

In some examples, a first memory component of the plurality of memory components implements a first solid state drive (SSD) and a second memory component of the plurality of memory components implements a second SSD. In some examples, a size of each region in the first set of regions differs from a size of each region in the second set of regions. In some cases, a first of the plurality of error correction parity information stripes is generated in response to determining that a collection of the set of data has been written across each of the plurality of memory components.

In some examples, the controller generates a first virtual region representing a first entire writable space of a first memory component of the plurality of memory components and generates a second virtual region representing a second entire writable space of a second memory component of the plurality of memory components. The first virtual region and the second virtual region can be generated to have identical sizes limited by a size of a smallest of the first and second entire writable spaces. In some examples, each of the plurality of error correction parity information stripes is generated using data written to the first and second virtual regions independently of physical storage locations of the data on the plurality of memory components.

In some examples, the controller maps storage locations represented by the first and second virtual regions to physical storage locations on the plurality of memory components. In some examples, the one or more of the plurality of error correction parity information stripes are sequentially adjacent.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, one of the memory components 112A to 112N can be associated with a first RG and another one of the memory components 112A to 112N can be associated with a second RG. In some cases, a first portion of the memory components 112A to 112N can be associated with a first RU of the first RG and a second portion of the memory components 112A to 112N can be associated with a second RU of the second RG. The memory sub-system 110 can have any number of RGs and any number of RUs within each RG and can, in some cases, can implement the FDP.

In some examples, a memory or register can be associated with all of the memory components 112A to 112N and can store a table that maps portions of the memory components 112A to 112N to different groups of RGs. The table can specify which set of memory components 112A to 112N maps to or is associated with and grouped with a first RG, and within that set, which portions of the memory components 112A to 112N correspond to RUs within the first RG. The table can also store an indication and keep track of the number of PEC of the first RG. Similarly, the table can specify which other set of memory components 112A to 112N maps to or is associated with and grouped with a second RG, and within that set, which portions of the memory components 112A to 112N correspond to RUs within the second RG. In some cases, the table stores a list of LBAs associated with each RU. In some cases, the table stores a map between a virtual region of a given memory component that is used to generate RAID stripes and the corresponding physical storage locations of the virtual region. While the below discussion is provided with RAID stripes as examples, similar techniques can be applied to any other type of error correction parity information stripe.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components and/or storage devices. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) PEC values and/or reliability grades associated with different groups of the memory components 112N to 112N and/or different blocks within each of the memory components 112N to 112N and/or different RUs, and/or different RGs and/or sizes of storage regions (e.g., RUs, RGs, and/or blocks) of each memory component used to implement the memory sub-system. For example, the memory sub-system may be made up of three memory components (e.g., three SSDs). A first of the three memory components may be configured to store data in a first set of regions each being a first size; a second of the three memory components may be configured to store data in a second set of regions each being a second size; and a third of the three memory components may be configured to store data in a third set of regions each being a third size. The first, second, and third sizes can be equal or non-equal. The configuration data can specify the sizes of the set of regions of each of the memory components. Using the sizes, the memory sub-system controller 115 can select a minimum quantity of RAID stripes to delete concurrently or in a batch to ensure that at least one entire region is emptied in each of the three memory components.

In some examples, commands or operations received from the host system 120 can include a write command, which can specify or identify an individual RG and/or RU within the individual RG to which to program data. Based on the individual RG specified by the write command, the memory sub-system controller 115 can determine the memory components 112A to 112N associated with the individual RG and can generate a write pointer that is used to program the data to the determined memory components 112A to 112N. In some cases, the host system 120 can select an individual RU handle and can program data using the selected individual RU handle. Any data that is written by the host system 120 using the individual RU handle can be stored to a specified RU that is associated with the RU handle. Based on which RU handle is used by the host system 120 to program data, different RUs are used by the host system 120 to physically store the data. In some cases, the host system 120 can track which LBAs are associated with which RU handles and can determine based on the LBAs the RUs in which the data is stored.

In some examples, the commands or operations received from the host system 120 can include a write command, which can specify or identify an individual virtual memory group in which to program data. Based on the virtual memory group specified by the write command, the memory sub-system controller 115 can determine the memory components 112A to 112N (e.g., the RUs, LBAs, and/or RGs) associated with the virtual memory group and can program the data into the determined memory components 112A to 112N. In some cases, the host system 120 can select an individual virtual memory group to invalidate and can issue an invalidate command to the memory sub-system controller 115 identifying the individual virtual memory group. In response, the memory sub-system controller 115 can identify a list of memory components 112A to 112N (e.g., one or more RUs and/or RGs) that are used to store the data for the individual virtual memory group. The memory sub-system controller 115 can then find the valid data in the list of memory components 112A to 112N that belong to another virtual memory group. The memory sub-system controller 115 can then re-write the found valid data from the other virtual memory group to a different memory component(s) 112A to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to ensure that RAID stripes are deleted in a way that results in at least one entire empty region in each memory component used to store data as part of the RAID. This increases the overall efficiency of operating the memory sub-system 110.

Specifically, the media operations manager 122 can store a set of data across a plurality of memory components, a first of the plurality of components being configured to store data in a first set of regions, a second of the plurality of components being configured to store data in a second set of regions. The media operations manager 122 generates a plurality of error correction parity information stripes for multiple collections of the set of data and computes a quantity of the plurality of error correction parity information stripes to delete based on sizes of each region in the first and second sets of regions. The media operations manager 122 deletes one or more of the plurality of error correction parity information stripes based on the computed quantity.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
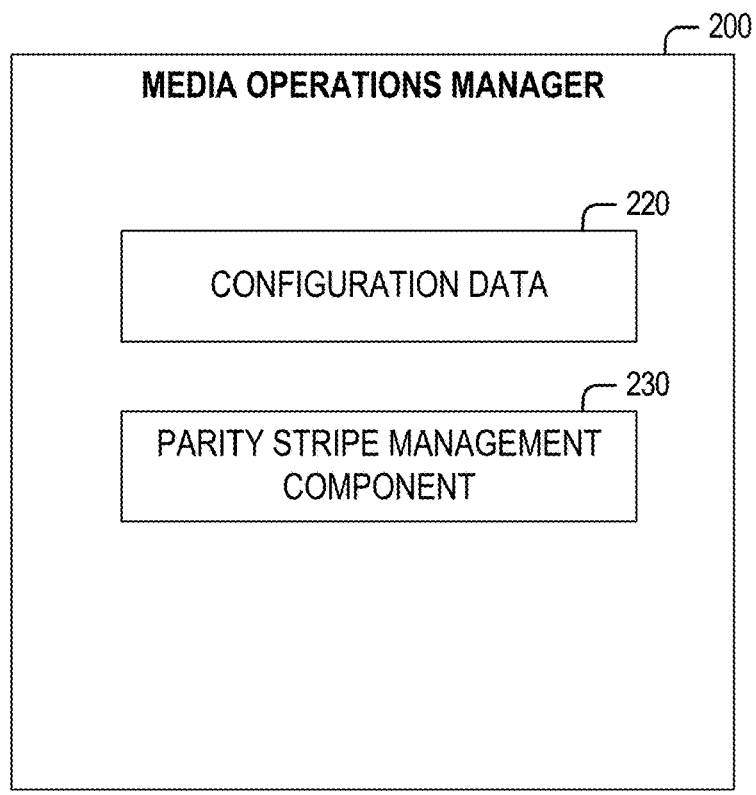
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220 and a parity stripe management component 230. For some examples, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including virtual memory group assignments to physical memory components, lifetime (maximum) PEC values of different bins, groups, blocks, block stripes, memory dies, RUs, RGs, and/or sets of the memory components 112A to 112N, and/or group assignments that define the sizes of different RU and RGs or regions of the memory components used to store data. The media operations manager 122 can receive configuration data from the host system 120 and stores the configuration data in the configuration data 220. In some cases, the media operations manager 122 accesses region size information from each of the memory components used to store data in the memory sub-system 110 and can communicate that information to the host system 120.

The configuration data 220 can store a map that identifies which sets of memory components 112A to 112N are used to implement different RGs. The configuration data 220 can store a table that maps different virtual memory groups to different physical memory components 112A to 112N (e.g., different RUs, RGs, and/or LBAs). For example, the configuration data 220 can store a map that associates a first RG with a first portion of the memory components 112A to 112N (e.g., a first die or first set of LBAs) and that associates a second RG with a second portion of the memory components 112A to 112N (e.g., a second die or second set of LBAs). The configuration data 220 can store a table that associates a first virtual memory group with a first portion of the memory components 112A to 112N (e.g., a first die, a first portion of a first RU) and that associates a second virtual memory group with a second portion of the memory components 112A to 112N (e.g., a second die or second portion of the first RU and a first portion of a second RU). The map can store an indication of the physical addresses or LUN of the first portion of the memory components 112A to 112N associated with the first RG and/or virtual memory group and an indication of the physical addresses or LUN of the second portion of the memory components 112A to 112N associated with the second RG and/or virtual memory group.

In some examples, a virtual region is formed for each memory component of the memory components 112A to 112N. To form the virtual region, the parity stripe management component 230 can determine the maximum entire writable space for each memory component of the memory components 112A to 112N. The parity stripe management component 230 can determine the smallest value of the determined maximum entire writeable space. Based on that smallest value, the parity stripe management component 230 can generate a first virtual region having the smallest value and associate the first virtual region with a first memory component of the memory components 112A to 112N. The parity stripe management component 230 can generate a second virtual region having the smallest value and associate the second virtual region with a second memory component of the memory components 112A to 112N. The parity stripe management component 230 can generate a third virtual region having the smallest value and associate the third virtual region with a second memory component of the memory components 112A to 112N. The parity stripe management component 230 can continue generating virtual regions for each additional memory component of the memory components 112A to 112N used to implement the memory sub-system 110. The parity stripe management component 230 can then update the configuration data 220 with information that maps an address space of each virtual region to the physical space on the corresponding memory component.

In this way, RAID stripes can be generated using the virtual regions independently of the sizes or region boundaries of the memory components. Specifically, the memory sub-system controller 115 can store data using the first, second, and third virtual regions. The memory sub-system controller 115 can then use the map of the virtual address space to the physical address space to control the storage of data on the physical regions of each memory component. In some cases, after the memory sub-system controller 115 stores a collection of data across all of the virtual regions (e.g., data is stored in a first portion of the first virtual region, a second portion of the second virtual region, and a third portion of the third virtual region), the memory sub-system controller 115 generates parity information and forms a RAID stripe that includes the parity information and the collection of data. A mapping can be generated between the virtual addresses of the RAID stripe and the physical addresses on the memory components. The generation of the parity information can be triggered when the collection of data that is written reaches a threshold size or amount. In some cases, the virtual regions can be mapped to RUs and/or RGs of the memory components.

Figure 3:
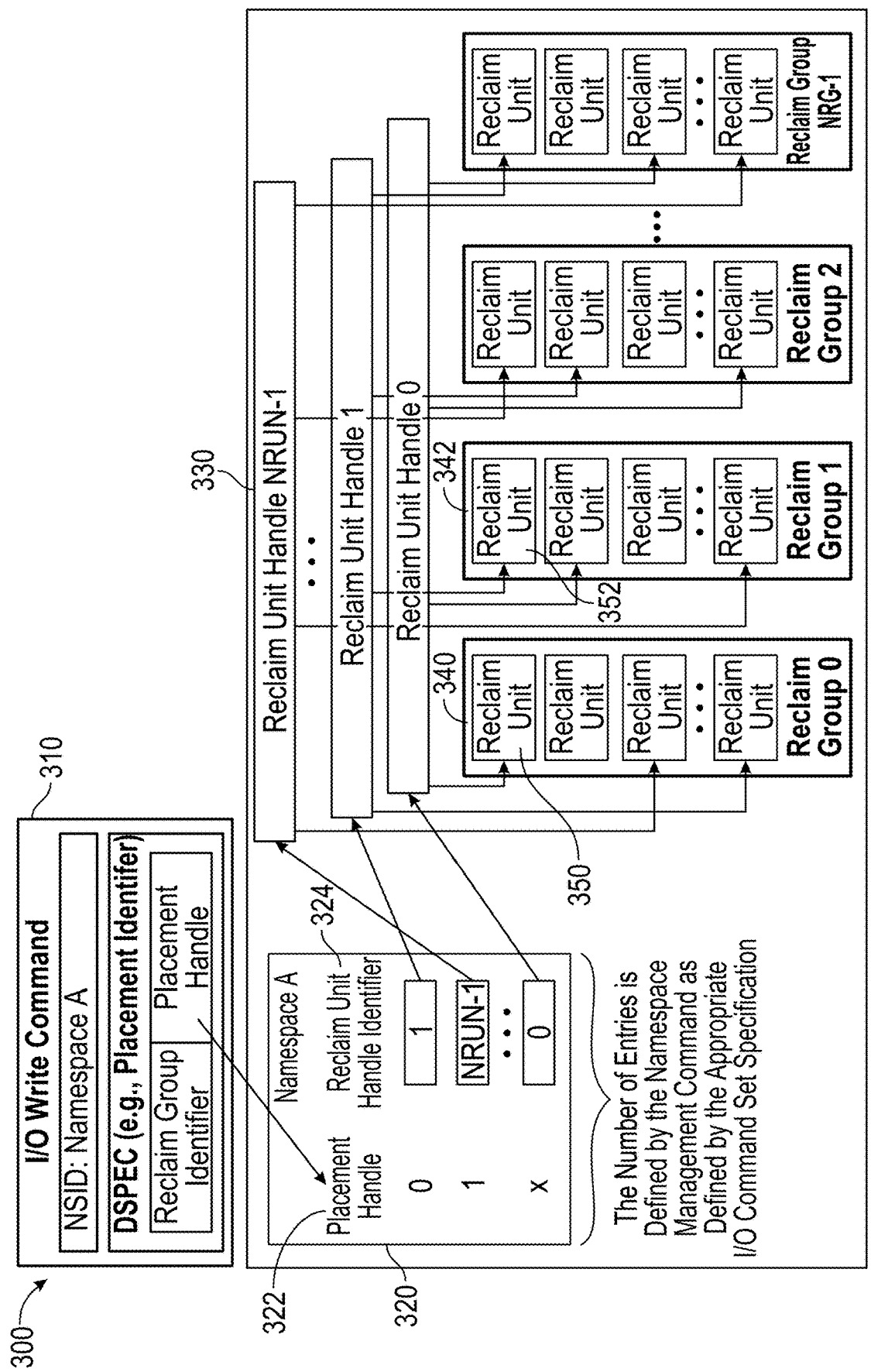
FIG. 3 is a block diagram of an example RG system implementation of the memory sub-system, in accordance with some implementations of the present disclosure.

For example, FIG. 3 is a block diagram of an example RG system 300 implementation of the memory sub-system 110. The RG system 300 includes a placement handle component 320 that is used to store the map of different groups (e.g., the map stored by the configuration data 220). The RG system 300 can receive a write command 310 that specifies at least a RG and/or a placement handle. The placement handle component 320 can search the map using the placement handle 322 to identify the RU 324 associated with the specified RG. The RG system 300 can then generate a write pointer 330 to write data to the identified RU 324.

As shown in FIG. 3, multiple RGs are defined. For example, the RG system 300 includes a first RG 340 and a second RG 342. The first RG 340 includes a first group of RUs 350. The second RG 342 includes a second group of RUs 352. In some cases, the first RG 340 can represent a single memory die and the second RG 342 represents another single memory die. In some cases, the first RG 340 can represent a first SSD and the second RG 342 represents a second SSD. Each RU in the first group of RUs 350 is implemented by a portion of the memory components 112A to 112N, such as blocks, planes, superblocks, pages, and so forth. Similarly, each RU in the second group of RUs 350 is implemented by a different portion of the memory components 112A to 112N, such as blocks, planes, superblocks, pages, and so forth. All of the garbage collection operations performed within RUs of an individual RG can be constrained to that individual RG. For example, garbage collection operations performed on an individual RU of the first group of RUs 350 fold data using only the RUs in the first group of RUs 350, and garbage collection operations performed on an individual RU of the second group of RUs 352 fold data using only the RUs in the second group of RUs 352. The virtual region can correspond to any one of the RGs and/or RUs and/or collection of RGs and/or RUs.

Referring back to FIG. 2, the parity stripe management component 230 controls deletion of RAID stripes in a way that ensures at least one entire physical region is emptied and deleted from each memory component of the memory components 112A to 112N. For example, if three memory components 112A to 112N are used to store data, the parity stripe management component 230 ensures that when a RAID stripe is deleted, at least one entire region is emptied from a first of the three memory components 112A to 112N, at least one entire region is emptied from a second of the three memory components 112A to 112N, and at least one entire region is emptied from a third of the three memory components 112A to 112N.

In some examples, the parity stripe management component 230 can determine a first size of a first region in the first set of regions of the first memory component and determines a second size of a second region in the second set of regions of the second memory component. The parity stripe management component 230 can compare the first size to the second size to determine that the second size is larger than the first size. In response to determining that the second size is larger than the first size, the parity stripe management component 230 computes the quantity of RAID stripes to delete based on the second size. Specifically, the parity stripe management component 230 multiplies the second size by a factor of two or more and then multiplies that number by the quantity of memory components used to implement the RAID (e.g., three memory components). The result of this computation is a minimum error correction parity information (RAID) stripe deletion size.

The parity stripe management component 230 can determine a size of each RAID stripe of the plurality of error correction parity information stripes. Namely, the parity stripe management component 230 can determine the size by summing how much data was written as part of a collection of data that was used to generate parity information to form the RAID stripe. The parity stripe management component 230 can determine whether the size of the RAID stripe transgresses, exceeds or is greater than the minimum error correction parity information (RAID) stripe deletion size. If not, the parity stripe management component 230 combines one or more additional RAID stripes with the RAID stripe until a total size of all the RAID stripes in a set of RAID stripes to be deleted transgresses, exceeds or is greater than the minimum error correction parity information (RAID) stripe deletion size. The parity stripe management component 230 can then delete all of the RAID stripes in the set of RAID stripes concurrently or jointly, which results in at least one entire physical region being emptied and deleted from each memory component of the memory components 112A to 112N.

Figure 4:
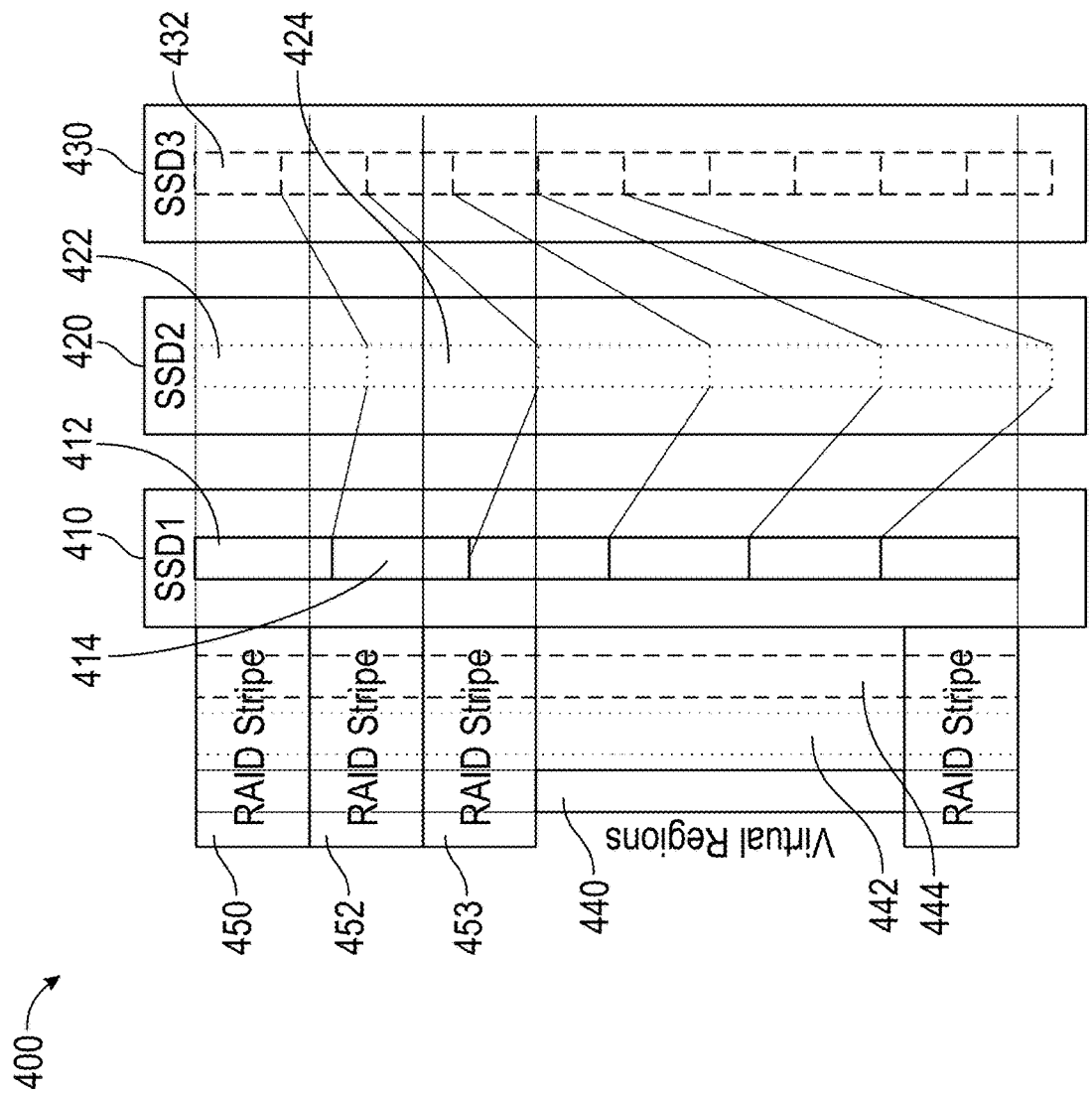
FIG. 4 is a block diagram of an example of error correction parity information stripes, in accordance with some implementations of the present disclosure.

FIG. 4 is a block diagram of an example 400 of error correction parity information stripes, in accordance with some implementations of the present disclosure. For example, as shown in example 400, the memory sub-system 110 can be constructed using a first memory component 410 (e.g., a first SSD), second memory component 420 (e.g., a second SSD), and a third memory component 430 (e.g., a third SSD). The first memory component 410 can be configured to store data using equal or non-equal sized regions 412 and 414. The equal or non-equal sized regions 412 and 414 can each be of a first size. The second memory component 420 can be configured to store data using equal or non-equal sized regions 422 and 424. The equal or non-equal sized regions 422 and 424 can each be of a second size. The third memory component 430 can be configured to store data using equal or non-equal sized regions 432, which can each be of a third size.

The parity stripe management component 230 can determine the entire writeable space of each of the first memory component 410, second memory component 420, and the third memory component 430. For example, the entire writeable space of the first memory component 410 can be computed by the size between a top of a first region of the first memory component 410 and a bottom of a last region of the first memory component 410. The entire writeable space of the second memory component 420 can be computed by the size between a top of a first region of the second memory component 420 and a bottom of a last region of the second memory component 420. The entire writeable space of the third memory component 430 can be computed by the size between a top of a first region of the third memory component 430 and a bottom of a last region of the third memory component 430. The parity stripe management component 230 can determine that the first memory component 410 has the smallest entire writeable space.

In such cases, the parity stripe management component 230 can generate virtual regions 440, 442, and 444 associated with each of the first memory component 410, second memory component 420, and third memory component 430 and having equal sizes corresponding to the smallest entire writeable space of the first memory component 410. Specifically, a first virtual region 440 can be associated with the first memory component 410 and can be of a size of the entire writeable space of the first memory component 410. A second virtual region 442 can be associated with the second memory component 420 and can be of the size of the entire writeable space of the second memory component 420. A third virtual region 444 can be associated with the third memory component 430 and can be of the size of the entire writeable space of the third memory component 430.

The parity stripe management component 230 can receive a stream of data and can write the stream of data across the virtual region 440, the virtual region 442, and the virtual region 444. Specifically, the parity stripe management component 230 can write the stream of data starting from a first address of the virtual region 440, and then continuing on to a first address of the virtual region 442, and then continuing on to a first address of the virtual region 444. After writing to the first address of the virtual region 444, the parity stripe management component 230 can return to writing data to a second address of the virtual region 440 and across the virtual region 442 and virtual region 444. This continues in a looped and wraparound manner until the amount of data written reaches a parity threshold. At that point, the parity stripe management component 230 can generate parity information for the collection of data that has reached the parity threshold and generates a RAID stripe 450 that includes the collection of data and the parity information. The parity stripe management component 230 can similar generate a second RAID stripe 452 for data written subsequent to the collection of data and can generate a third RAID stripe 453 for data written after a collection of data associated with the second RAID stripe 452.

In order to delete RAID stripes, the parity stripe management component 230 ensures that an entire region is emptied from each of the first memory component 410, second memory component 420, and third memory component 430. For example, the parity stripe management component 230 selects a certain quantity of RAID stripes to delete that in aggregate have a size that results in the region 412 of the first memory component 410 being emptied, the region 422 of the second memory component 420 being emptied, and the region 432 of the third memory component 430 being emptied. In some examples, the parity stripe management component 230 accesses configuration information from the configuration data 220 to determine the sizes of each region of the first memory component 410, second memory component 420, and third memory component 430.

The parity stripe management component 230 can identify the largest region size among the regions of the first memory component 410, second memory component 420, and third memory component 430. In an example, the parity stripe management component 230 determines that the second memory component 420 includes the largest region size. In such cases, the parity stripe management component 230 can determine that deletion of only one RAID stripe 450 results in emptying region 432 entirely but may delete less than all of the region 422 and region 412. To ensure at least one region is emptied from all of the memory components, the parity stripe management component 230 can compute a minimum RAID stripe size by multiplying the largest region size by a factor of two or more and multiplying that value by the quantity of memory components (e.g., three) used to implement the memory sub-system 110. In this case, the parity stripe management component 230 can compute the minimum RAID stripe size by multiplying the size of the region 422 by two and then multiplying that value by three (e.g., because there exist three memory components: first memory component 410, second memory component 420 and third memory component 430). The parity stripe management component 230 can then combine a sufficient quantity of RAID stripes (e.g., RAID stripe 450, second RAID stripe 452, and third RAID stripe 453) so that a total size of the combined RAID stripes meets or exceeds the minimum RAID stripe size. In this example, deleting RAID stripe 450, second RAID stripe 452, and third RAID stripe 453 results in completely emptying the regions 412 and 414 of the first memory component 410, the regions 422 and 424 of the second memory component 420, and multiple regions 432 of the third memory component 430.

Figure 5:
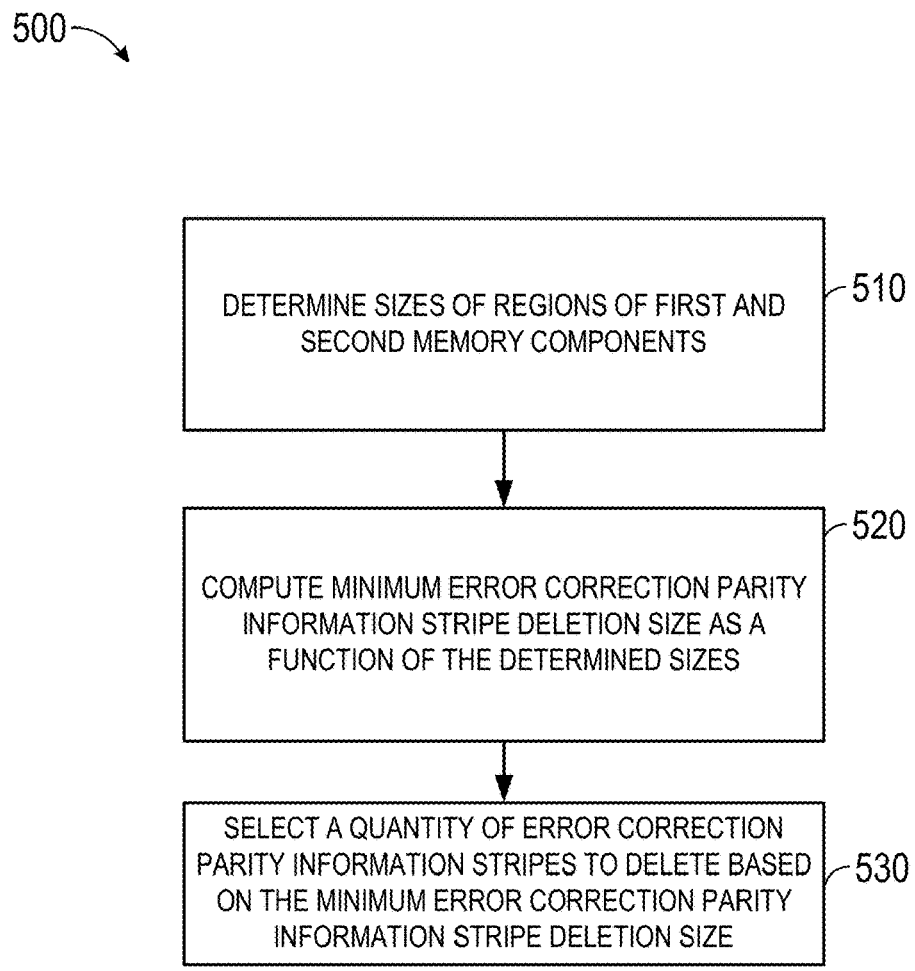
FIGS. 5 and 6 are flow diagrams of example methods to allow a host (or RAID controller) to control deletion of error correction parity information stripes from a memory sub-system, in accordance with some implementations of the present disclosure.

FIG. 5 is a flow diagram of an example method 500 to allow a host (or RAID/RAIN controller) to control the deletion of parity stripes from the memory sub-system, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 510, with a host system 120 (or RAID/RAIN controller) determining sizes of regions of first and second memory components, such as by accessing configuration data and determining region sizes of blocks, RUs and/or RGs. Then, at operation 520, the host system 120 (or RAID/RAIN controller) computes a minimum error correction parity information stripe deletion size as a function of the determined sizes. At operation 530, the host system 120 (or RAID/RAIN controller) selects a quantity of error correction parity information stripes to delete based on the minimum error correction parity information stripe deletion size.

Figure 6:
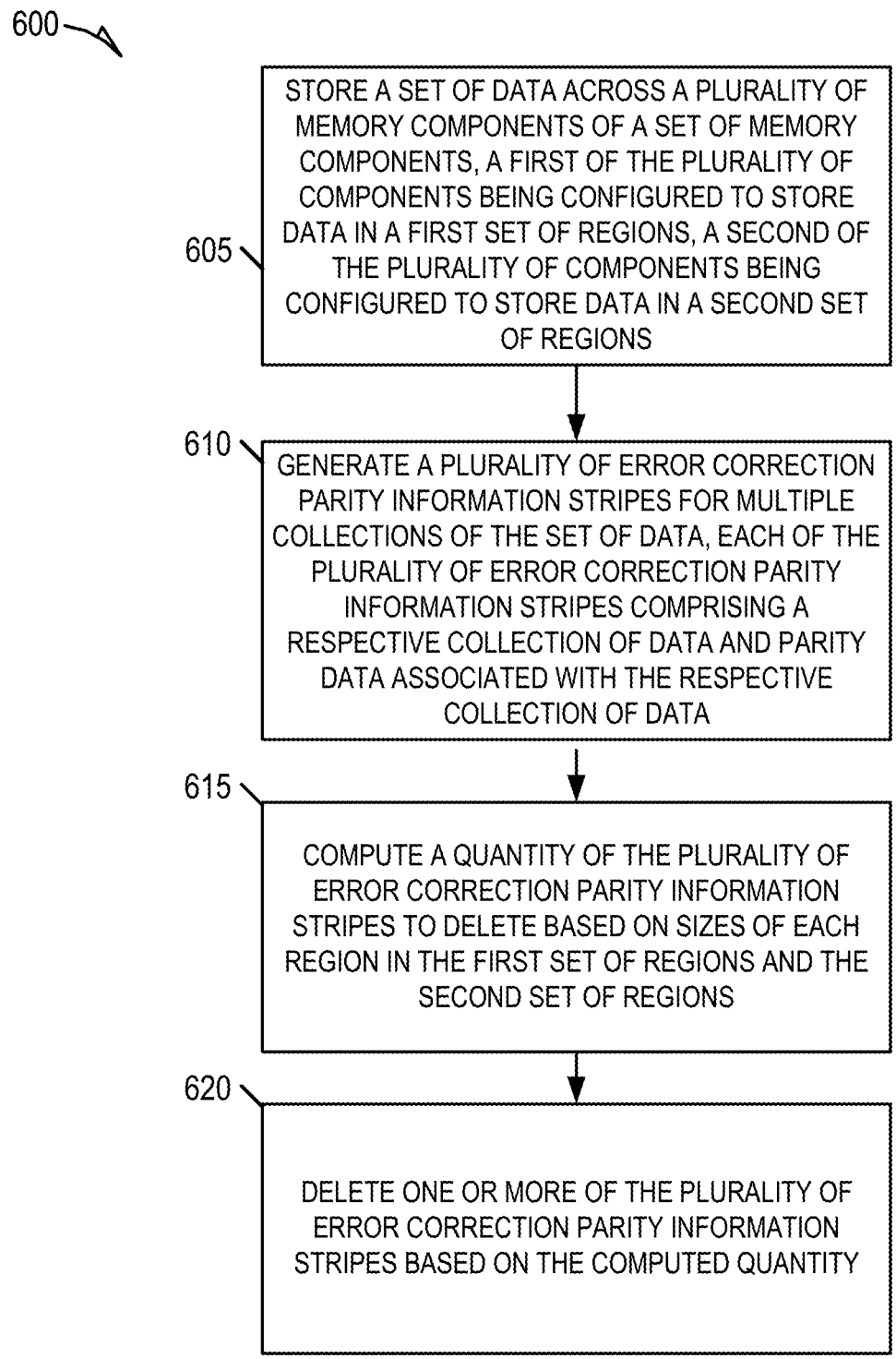

FIG. 6 is a flow diagram of an example method 600 to allow a host to control the invalidation of data on the memory sub-system, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 600 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 6, the method (or process) 600 begins at operation 605, with a media operations manager 122 of a memory sub-system (e.g., memory sub-system 110) storing a set of data across a plurality of memory components of a set of memory components, a first of the plurality of components being configured to store data in a first set of regions, a second of the plurality of components being configured to store data in a second set of regions. Then, at operation 610, the media operations manager 122 generates a plurality of error correction parity information stripes for multiple collections of the set of data, each of the plurality of error correction parity information stripes comprising a respective collection of data and parity data associated with the respective collection of data. At operation 615, the media operations manager 122 computes a quantity of the plurality of error correction parity information stripes to delete based on a size of each region in the first set of regions and the second set of regions and, at operation 620, deletes one or more of the plurality of error correction parity information stripes based on the computed quantity.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: storing a set of data across a plurality of memory components of the set of memory components, a first of the plurality of components being configured to store data in a first set of regions, a second of the plurality of components being configured to store data in a second set of regions; generating a plurality of error correction parity information stripes for multiple collections of the set of data, each of the plurality of error correction parity information stripes comprising a respective collection of data and parity data associated with the respective collection of data; computing a quantity of the plurality of error correction parity information stripes to delete based on sizes of each region in the first set of regions and the second set of regions; and deleting one or more of the plurality of error correction parity information stripes based on the computed quantity.

Example 2. The system of Example 1, wherein the memory sub-system includes Flexible Data Placement (FDP).

Example 3. The system of Example 2, the operations comprising: grouping the set of memory components into a plurality of reclaim groups (RGs), each RG of the plurality of RGs comprising a subset of reclaim units (RUs), the first set of regions comprising a first subset of RUs and the second set of regions comprising a second subset of RUs.

Example 4. The system of any one of Examples 1-3, wherein the plurality of error correction parity information stripes comprises Redundant Array of Independent Nodes (RAIN) or Redundant Array of Independent Disks (RAID) parity data.

Example 5. The system of any one of Examples 1-4, the operations comprising: determining a first size of a first region in the first set of regions; determining a second size of a second region in the second set of regions; determining that the second size is larger than the first size; and in response to determining that the second size is larger than the first size, computing the quantity of the plurality of error correction parity information stripes to delete based on the second size.

Example 6. The system of Example 5, the operations comprising: computing a first value by multiplying the second size by a factor of two or more; determining how many memory components are included in the plurality of memory components; and multiplying the first value by a number that represents how many memory components are included in the plurality of memory components to compute a minimum error correction parity information stripe deletion size.

Example 7. The system of Example 6, the operations comprising: determining a size of each error correction parity information stripe of the plurality of plurality of error correction parity information stripes.

Example 8. The system of Example 7, the operations comprising: selecting a first error correction parity information stripe to delete; determining that the size of the first error correction parity information stripe is smaller than the minimum error correction parity information stripe deletion size; and in response to determining that the size of the first error correction parity information stripe is smaller than the minimum error correction parity information stripe deletion size, selecting one or more additional error correction parity information stripes to delete until a total size of the first error correction parity information stripe and the one or more additional error correction parity information stripes corresponds to the minimum error correction parity information stripe deletion size.

Example 9. The system of any one of Examples 5-8, the operations comprising: accessing configuration data associated with the memory sub-system to determine sizes of the first set of regions and the second set of regions.

Example 10. The system of any one of Examples 1-9, wherein a host computes the quantity of the plurality of error correction parity information stripes to delete.

Example 11. The system of any one of Examples 1-10, wherein a first memory component of the plurality of memory components implements a first solid state drive (SSD) and a second memory component of the plurality of memory components implements a second SSD.

Example 12. The system of any one of Examples 1-11, wherein a size of each region in the first set of regions differs from a size of each region in the second set of regions.

Example 13. The system of any one of Examples 1-12, wherein a first of the plurality of error correction parity information stripes is generated in response to determining that a collection of the set of data has been written across each of the plurality of memory components.

Example 14. The system of any one of Examples 1-13, the operations comprising: generating a first virtual region representing a first entire writable space of a first memory component of the plurality of memory components; and generating a second virtual region representing a second entire writable space of a second memory component of the plurality of memory components, wherein the first virtual region and the second virtual region are generated to have identical sizes limited by a size of a smallest of the first and second entire writable spaces.

Example 15. The system of Example 14, wherein each of the plurality of error correction parity information stripes is generated using data written to the first and second virtual regions independently of physical storage locations of the data on the plurality of memory components.

Example 16. The system of any one of Examples 14-15, the operations comprising: mapping storage locations represented by the first and second virtual regions to physical storage locations on the plurality of memory components.

Example 17. The system of any one of Examples 1-16, wherein the one or more of the plurality of error correction parity information stripes are sequentially adjacent.

Methods and computer-readable storage medium with instructions for performing any one of the above Examples.

Figure 7:
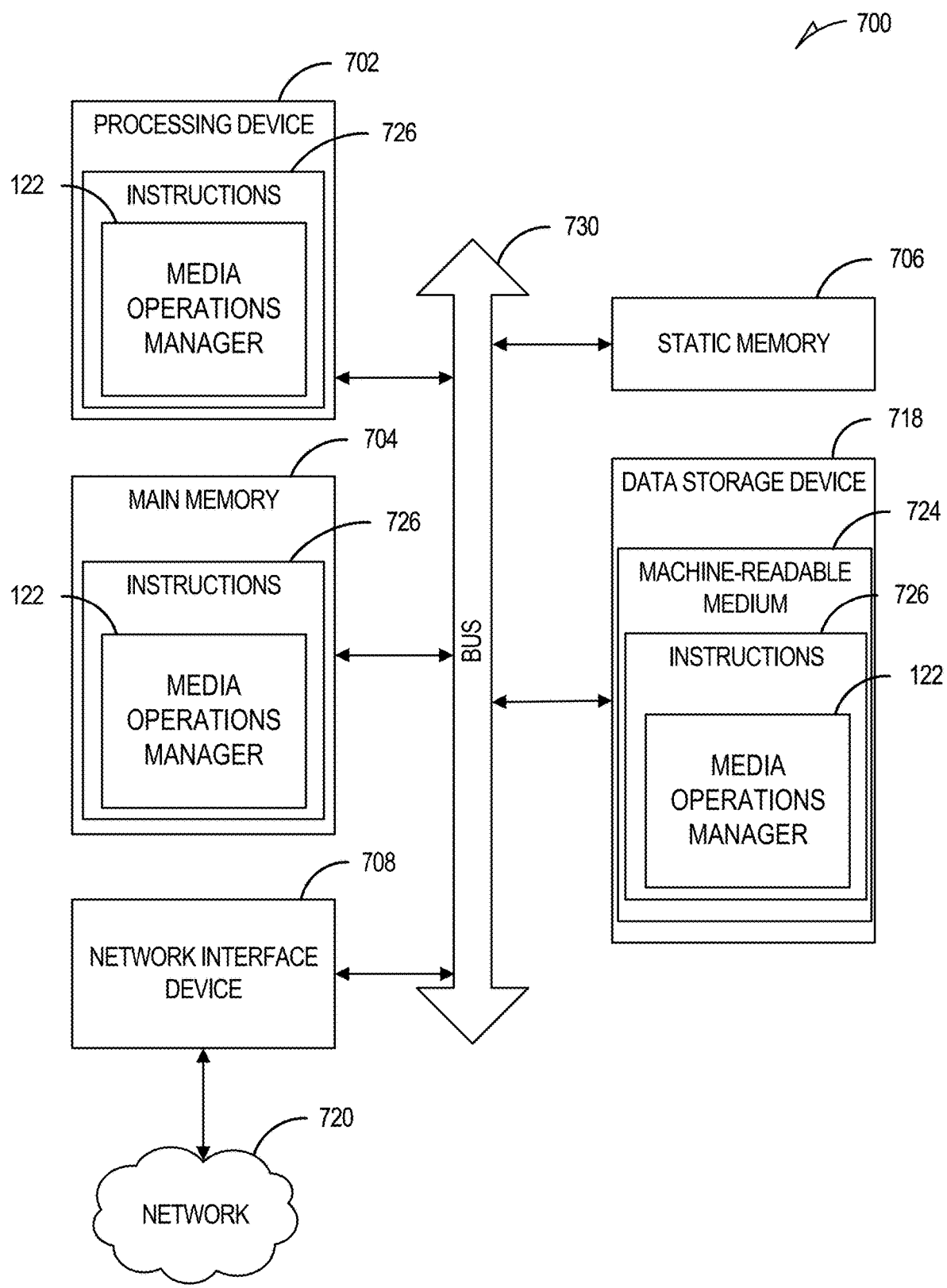
FIG. 7 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 7 illustrates an example machine in the form of a computer system 700 within which a set of instructions can be executed for causing the machine to perform any one or more of the methodologies discussed herein. In some examples, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one example, the instructions 726 implement functionality corresponding to the media operations manager 122 of FIG. 1. While the machine-readable storage medium 724 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
a set of memory components of a memory sub-system; and
at least one processing device operatively coupled to the set of memory components, the at least one processing device being configured to perform operations comprising:
storing a set of data across a plurality of memory components of the set of memory components, a first of the plurality of components being configured to store data in a first set of regions, a second of the plurality of components being configured to store data in a second set of regions;

generating a plurality of error correction parity information stripes for multiple collections of the set of data, each of the plurality of error correction parity information stripes comprising a respective collection of data and parity data associated with the respective collection of data;

computing a quantity of the plurality of error correction parity information stripes to delete based on sizes of each region in the first set of regions and the second set of regions; and deleting one or more of the plurality of error correction parity information stripes based on the computed quantity.

2. The system of claim 1, wherein the memory sub-system includes Flexible Data Placement (FDP).

3. The system of claim 2, the operations further comprising:

grouping the set of memory components into a plurality of reclaim groups (RGs), each RG of the plurality of RGs comprising a subset of reclaim units (RUs), the first set of regions comprising a first subset of RUs and the second set of regions comprising a second subset of RUs.

4. The system of claim 1, wherein the plurality of error correction parity information stripes comprises Redundant Array of Independent Nodes (RAIN) or Redundant Array of Independent Disks (RAID) parity data.

5. The system of claim 1, the operations further comprising:

determining a first size of a first region in the first set of regions;

determining a second size of a second region in the second set of regions;

determining that the second size is larger than the first size; and in response to determining that the second size is larger than the first size, computing the quantity of the plurality of error correction parity information stripes to delete based on the second size.

6. The system of claim 5, the operations further comprising:

computing a first value by multiplying the second size by a factor of two or more;

determining how many memory components are included in the plurality of memory components; and multiplying the first value by a number that represents how many memory components are included in the plurality of memory components to compute a minimum error correction parity information stripe deletion size.

7. The system of claim 6, the operations further comprising:

determining a size of each error correction parity information stripe of the plurality of plurality of error correction parity information stripes.

8. The system of claim 7, the operations further comprising:

selecting a first error correction parity information stripe to delete;

determining that the size of the first error correction parity information stripe is smaller than the minimum error correction parity information stripe deletion size; and in response to determining that the size of the first error correction parity information stripe is smaller than the minimum error correction parity information stripe deletion size, selecting one or more additional error correction parity information stripes to delete until a total size of the first error correction parity information stripe and the one or more additional error correction parity information stripes corresponds to the minimum error correction parity information stripe deletion size.

9. The system of claim 5, the operations further comprising:

accessing configuration data associated with the memory sub-system to determine sizes of the first set of regions and the second set of regions.

10. The system of claim 1, wherein a host computes the quantity of the plurality of error correction parity information stripes to delete.

11. The system of claim 1, wherein a first memory component of the plurality of memory components implements a first solid state drive (SSD) and a second memory component of the plurality of memory components implements a second SSD.

12. The system of claim 1, wherein a size of each region in the first set of regions differs from a size of each region in the second set of regions.

13. The system of claim 1, wherein a first of the plurality of error correction parity information stripes is generated in response to determining that a collection of the set of data has been written across each of the plurality of memory components.

14. The system of claim 1, the operations further comprising:

generating a first virtual region representing a first entire writable space of a first memory component of the plurality of memory components; and generating a second virtual region representing a second entire writable space of a second memory component of the plurality of memory components, wherein the first virtual region and the second virtual region are generated to have identical sizes limited by a size of a smallest of the first and second entire writable spaces.

15. The system of claim 14, wherein each of the plurality of error correction parity information stripes is generated using data written to the first and second virtual regions independently of physical storage locations of the data on the plurality of memory components.

16. The system of claim 14, the operations further comprising:

mapping storage locations represented by the first and second virtual regions to physical storage locations on the plurality of memory components.

17. The system of claim 1, wherein the one or more of the plurality of error correction parity information stripes are sequentially adjacent.

18. A method comprising:

storing a set of data across a plurality of memory components of a set of memory components, a first of the plurality of components being configured to store data in a first set of regions, a second of the plurality of components being configured to store data in a second set of regions;

generating a plurality of error correction parity information stripes for multiple collections of the set of data, each of the plurality of error correction parity information stripes comprising a respective collection of data and parity data associated with the respective collection of data;

computing a quantity of the plurality of error correction parity information stripes to delete based on sizes of each region in the first set of regions and the second set of regions; and deleting one or more of the plurality of error correction parity information stripes based on the computed quantity.

19. The method of claim 18, wherein the plurality of memory components are part of memory sub-system that includes Flexible Data Placement (FDP).

20. A non-transitory computer-readable storage medium comprising instructions that, when executed by at least one processing device, cause the at least one processing device to perform operations comprising:
   storing a set of data across a plurality of memory components of a set of memory components, a first of the plurality of components being configured to store data in a first set of regions, a second of the plurality of components being configured to store data in a second set of regions;
   generating a plurality of error correction parity information stripes for multiple collections of the set of data, each of the plurality of error correction parity information stripes comprising a respective collection of data and parity data associated with the respective collection of data;
   computing a quantity of the plurality of error correction parity information stripes to delete based on sizes of each region in the first set of regions and the second set of regions; and
   deleting one or more of the plurality of error correction parity information stripes based on the computed quantity.

* * * * *